(12) United States Patent
Yoshida et al.

(10) Patent No.: US 6,334,684 B1
(45) Date of Patent: *Jan. 1, 2002

(54) BUILT-IN KITCHEN HAVING PROJECTOR, AND COOKING ASSISTING IMAGE PROJECTING SYSTEM

(75) Inventors: Junko Yoshida, Sakai; Yayoi Kasai, Kawachinagano; Shoichi Minato, Sakai; Hideki Nagata, Kobe, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,173

(22) Filed: Mar. 18, 1999

(30) Foreign Application Priority Data

Mar. 20, 1998 (JP) ............................................. 10-072549

(51) Int. Cl.[7] .............................................. G03B 21/00
(52) U.S. Cl. ........................................... 353/28; 353/79
(58) Field of Search ............................... 353/28, 97, 98, 353/30, 74, 77, 71, 79

(56) References Cited

U.S. PATENT DOCUMENTS 4,240,721 A * 12/1980 Drop, Sr. ..................... 353/74
5,289,287 A * 2/1994 Dargis et al. .................. 353/74
5,349,400 A * 9/1994 Kaplan et al. ............... 353/119
5,428,415 A * 6/1995 Keelan et al. ................. 353/82
5,430,662 A * 7/1995 Ahonen ........................ 353/28
5,588,216 A * 12/1996 Rank et al. .................... 353/28
5,639,151 A * 6/1997 McNelley et al. ............. 353/98
5,741,057 A * 4/1998 Goldberg et al. ............. 353/74
5,772,301 A * 6/1998 Kwon et al. .................. 353/94
5,903,396 A * 5/1999 Rallison ....................... 359/13
5,957,559 A * 9/1999 Rueb et al. ................... 353/28

FOREIGN PATENT DOCUMENTS

| JP | 05007514 | 1/1993 |
|----|----------|--------|
| JP | 05332562 | 12/1993 |
| JP | 06110634 | 4/1994 |
| JP | 06119136 | 4/1994 |
| JP | 06181850 | 7/1994 |

* cited by examiner

Primary Examiner—William Dowling
(74) Attorney, Agent, or Firm—McDermott, Will & Emery

(57) ABSTRACT

A built-in kitchen which has a projector that projects an image and a screen onto which the image from the projector is projected. The projector projects a cooking assisting image such as recipe on the screen so that a cook can get cooking information through the projected image while staying in a working position.

20 Claims, 6 Drawing Sheets

BUILT-IN KITCHEN HAVING PROJECTOR, AND COOKING ASSISTING IMAGE PROJECTING SYSTEM

RELATED APPLICATION

This application is based on application No. Hei 10-072549 filed in Japan, the content of which is hereby incorporated by reference.

BACKGROUND OF THE INVENTION

1. Field of the Invention

The present invention relates to a built-in kitchen having a projector and a system for projecting cooking assisting images.

2. Description of the Related Art

When performing cooking, one sometimes refers to printed matter or a television program. When cooking is performed with reference to printed matter which is tolerant of neither water nor heat, the printed matter cannot be kept at hand. When cooking is performed with reference to a television program, it sometimes occurs that images change too fast or one has to turn around to view the television screen according to the position of the television set. Consequently, cooking is interrupted every time one views the printed matter or the television, so that cooking cannot be performed smoothly. This increases the time necessary for cooking.

SUMMARY OF THE INVENTION

An object of the present invention is to solve the above-mentioned problem.

Another object of the present invention is to provide a built-in kitchen and a cooking assisting image projecting system with which one can view information such as cooking procedures and methods of processing foodstuff while staying in a working position.

These and other objects are attained by a built-in kitchen having a projector that projects an image, and a screen onto which the image from the projector is projected.

Moreover, the above-mentioned objects of the present invention are attained by a built-in kitchen having a projector that projects an image from above and a reflective screen onto which the image from the projector is projected.

Moreover, the above-mentioned objects of the present invention are attained by a built-in kitchen having a projector that projects an image from below and a transmissive screen onto which the image from the projector is projected.

Moreover, the above-mentioned objects of the present invention are attained by a cooking assisting image projecting system having a projector that projects a cooking assisting image and a cooking table onto which the image from the projector is projected.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawing.

DESCRIPTION OF THE PREFERRED EMBODIMENT

Figure 1:
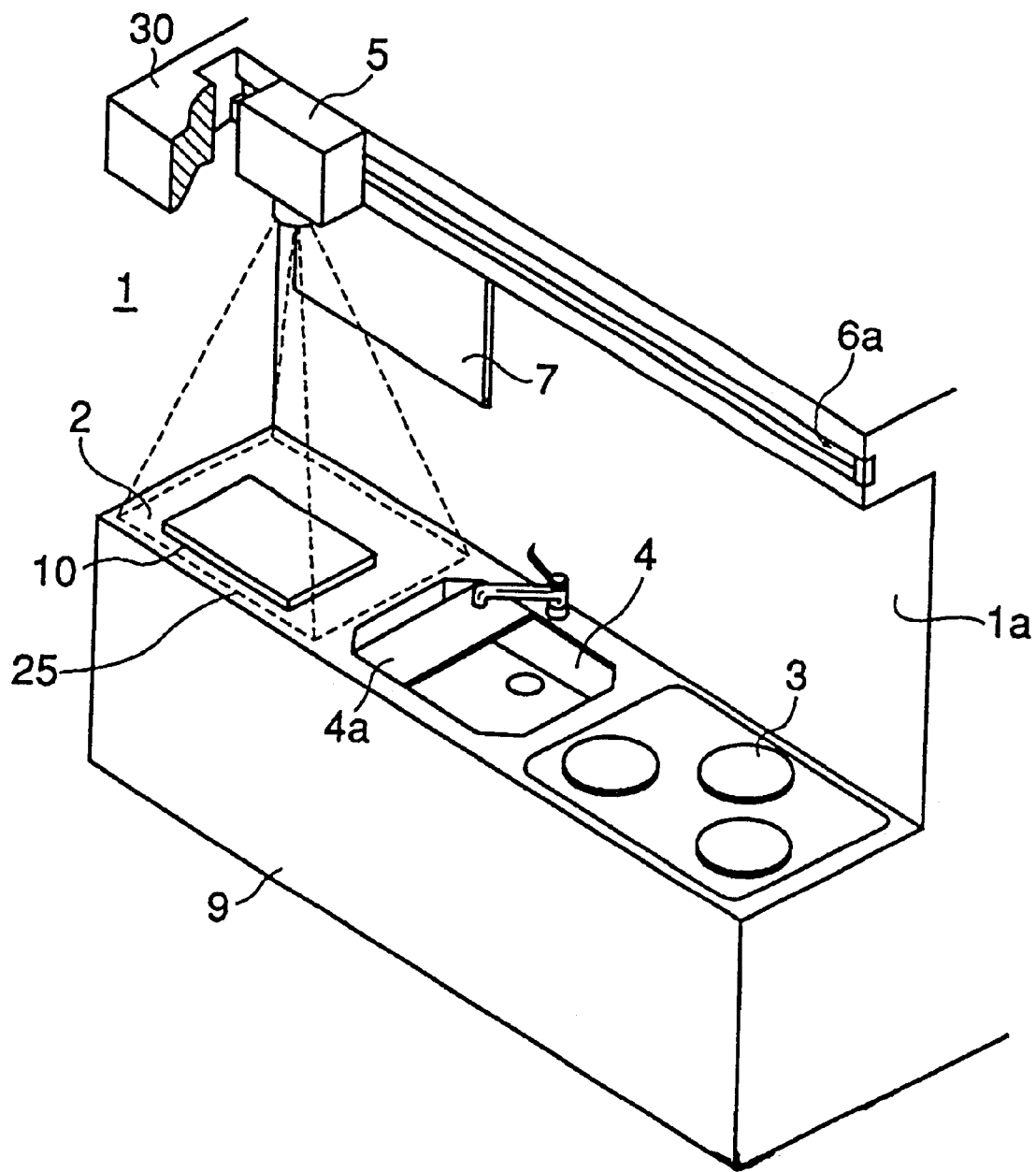
FIG. 1 is an exterior perspective view of a built-in kitchen.

Embodiments of the present invention will be described with reference to the drawings. FIG. 1 is an exterior perspective view showing a first embodiment of a built-in kitchen having a projector or a cooking assisting image projecting system. A built-in kitchen 1 comprises a base part 9 including a cooking table 2, a cooking stove 3 and a sink 4, and a top part (e.g. a cabinet) 30. A projector 5 is disposed in the top part 30. In FIG. 1, the top part 30 is partially cutaway so that the projector 5 can be seen.

In this embodiment, the projector 5 is disposed so as to project images downward, and the top surface of the cooking table 2 serves as the screen. Therefore, the color of the top surface of the cooking table 2 is selected from among light reflecting colors, for example, whitish colors. It is preferable that the color of the top surface be a whitish color because images are clearly projected.

The projector 5 has a moving member 6 (see subsequently-described FIG. 2) which moves along a guide 6a extending along the length of the cooking table 2. Therefore, forming the cooking stove 3, the sink 4 and a sliding cooking board 4a disposed across the sink 4 so as to serve as the screen enables the projector 5 to project images onto the screen in any position. A chopping board 10 placed on the cooking table 2 can also be formed so as to serve as the screen. The projector 5 may be driven either electrically or mechanically. Provision of an automatic focusing mechanism enables image projection onto various types of planes having different heights.

Figure 2:
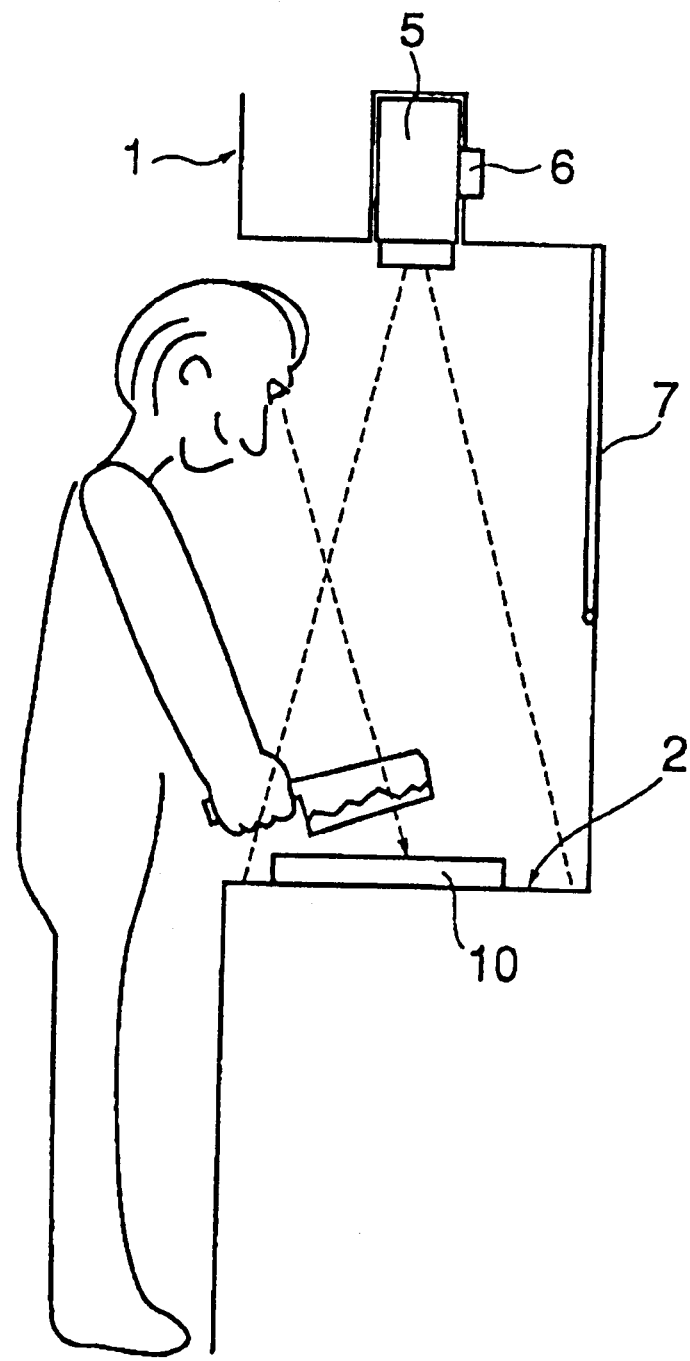
FIG. 2 is a side view showing a manner in which the built-in kitchen is used.

FIG. 2 shows a manner in which cooking is performed with the built-in kitchen 1. The projector 5 projects a recipe such as a cooking procedure or a method of processing foodstuff, or a television program on cooking onto the top surface (screen) of the cooking table 2. Since the images are projected onto the place on which the user sets his or her eyes to perform cooking, the user can comfortably perform cooking while viewing the projected images. Since the projector 5 is moved by the moving member 6, images can be projected onto the place where the user's hands performing cooking are present irrespective of the user's working position.

Figure 3:
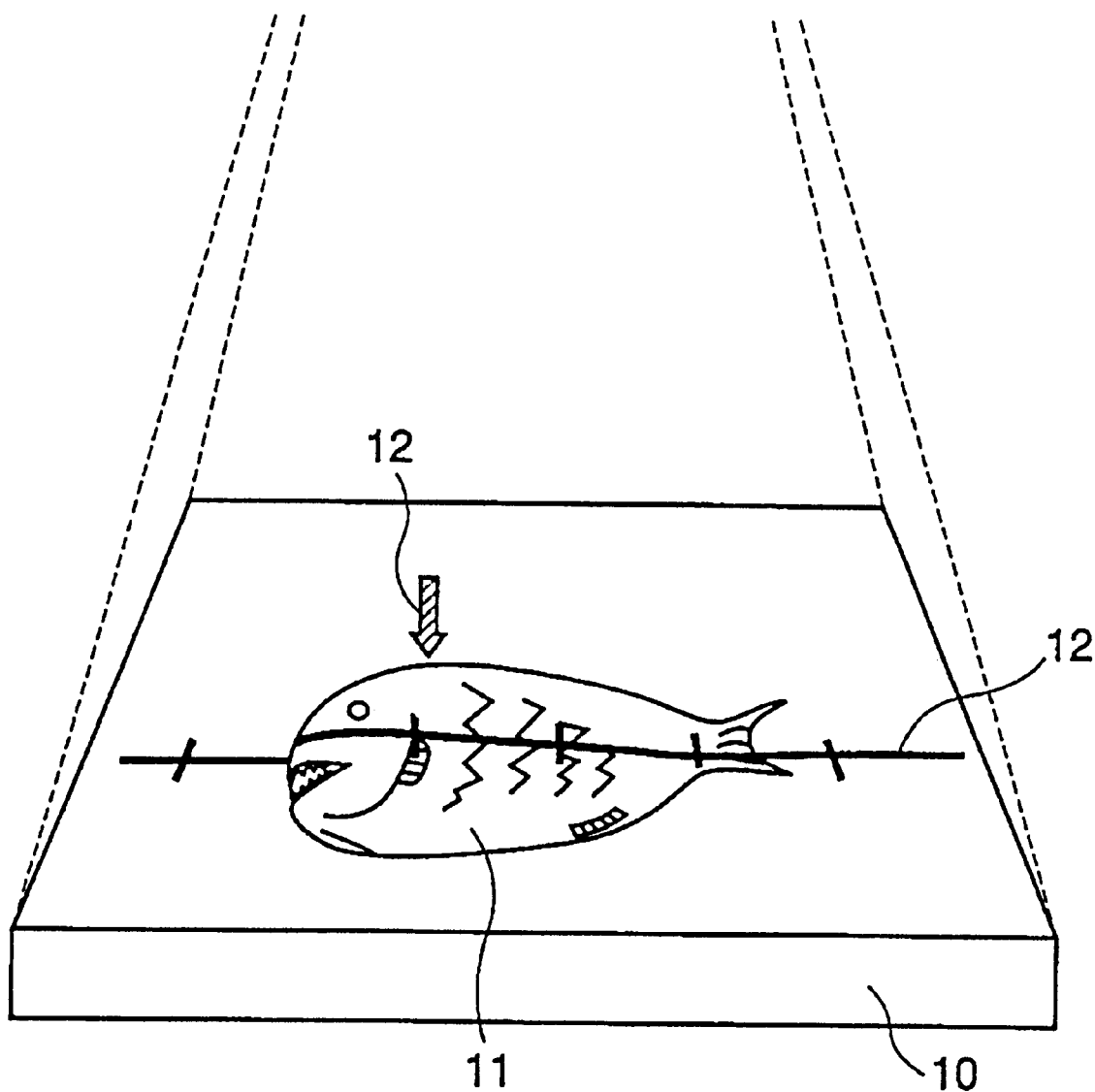
FIG. 3 shows a manner in which images are projected onto a chopping board.

FIG. 3 shows a manner in which images are projected onto the chopping board 10 placed on the cooking table. According to the figure, a fish 11 is placed on the chopping board 10, and images 12 such as a scale and an arrow are projected thereonto. The user has only to process the fish 11 in accordance with the instructions given by the images 12. Thus, unlike the conventional printed matter and television programs, methods of processing and cooking are more easily understood.

The built-in kitchen 1 has means for displaying images at the height of the user's eyes. As shown in FIG. 1, a half mirror 7 is attached to a front wall 1a of the built-in kitchen 1. The half mirror 7 which is pivotably supported at the lower side thereof by the front wall 1a can be pivoted forward about a fulcrum by a predetermined angle.

Figure 4:
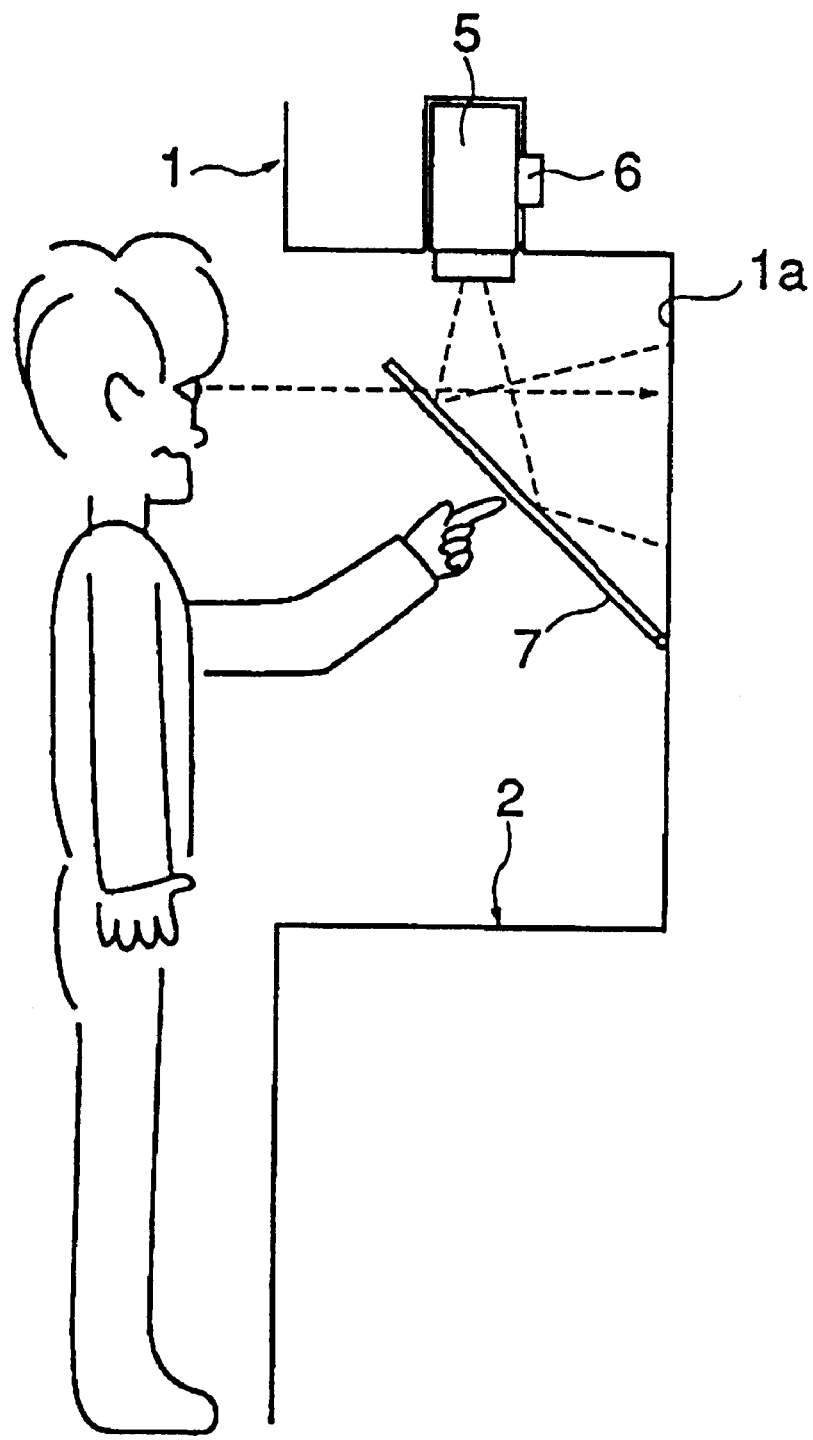
FIG. 4 is a side view showing a manner in which a half mirror is used.

FIG. 4 shows the half mirror 7 being inclined forward. As shown in the figure, the light from the projector 5 is reflected at the half mirror 7 to be projected onto the front wall 1a of the built-in kitchen 1. The user can view through the half mirror 7 the images projected onto the front wall 1a. Therefore, the position where images are projected can be selected in accordance with the circumstances. The half mirror 7 may be designed so as to be electrically moved.

In the above-described embodiment, description was given with reference to the built-in kitchen including the cooking table 2, the cooking stove 3 and the sink 4 and having the top part (comprising a cabinet or the like) 30. However, the present invention is not limited thereto but is applicable to any types of cooking equipment. Moreover, the projector 5 may be disposed in any position as long as images are projected onto the reflective screen on the top surface of the base part 9. It should also be noted that the size of the image projected onto the screen can be changed by a zooming function of the projector 5; the image size is not limited to the one shown in FIGS. 1 and 2 (a dotted line portion 25 extending from the projector 5) but can be adjusted as necessary.

Figure 5:
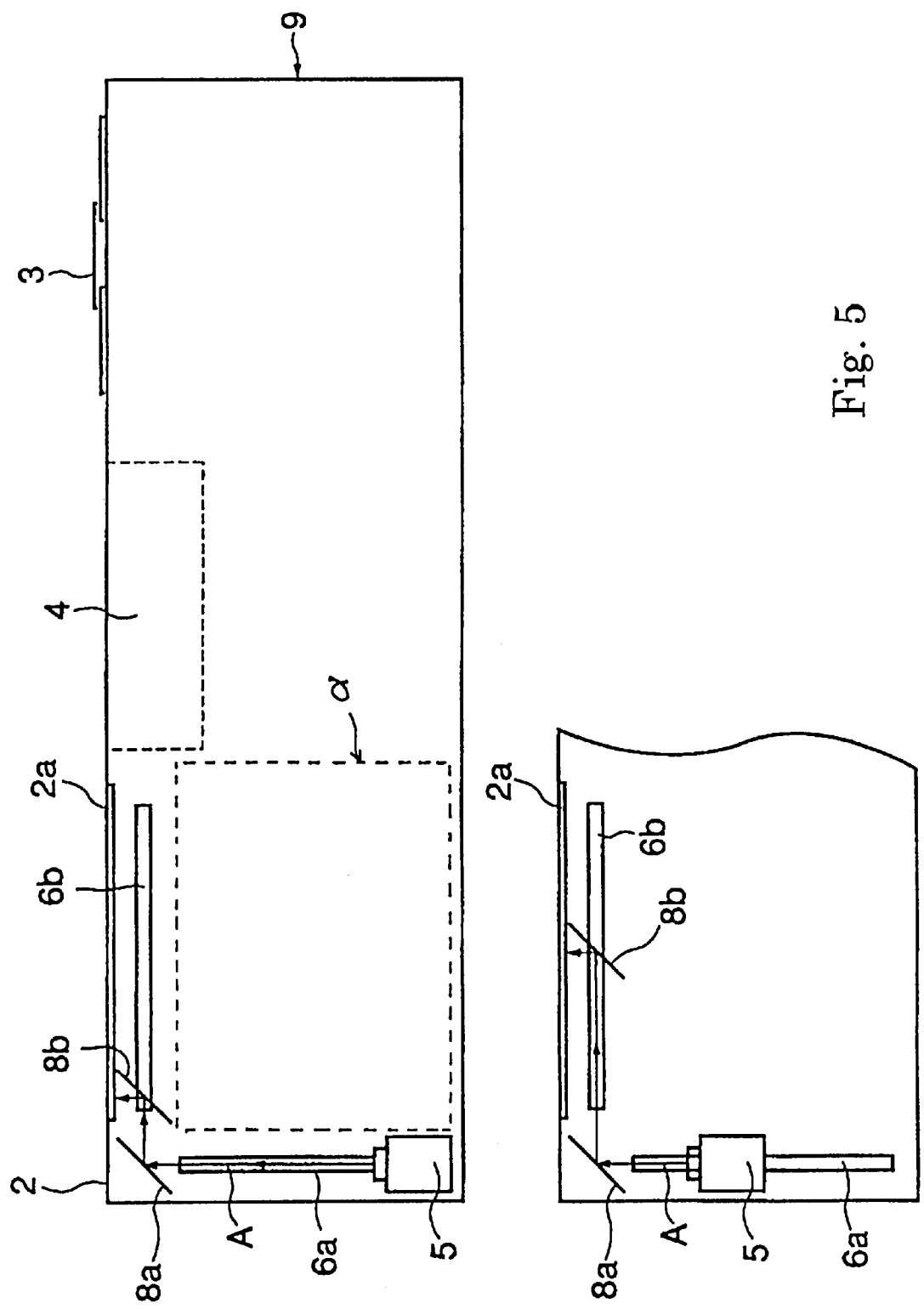
FIG. 5 is a schematic view showing an interior of a built-in kitchen (second embodiment)

Subsequently, a second embodiment of the present invention will be described. In a built-in kitchen of this embodiment, the image projection direction is different from that of the first embodiment. FIG. 5 is an interior schematic view showing only a lower part (the cooking table 2, the cooking stove 3 and the sink 4) of the built-in kitchen 1 of this embodiment. This figure shows the built-in kitchen 1 viewed from the front.

In this embodiment, in the base part 9, the projector 5 is disposed so as to project images upward. Reference number 6a' represents a moving member for moving the projector 5 upward and downward in the vertical direction. Reflecting mirrors 8a and 8b are disposed immediately below a top board 2a of the cooking table 2.

One reflecting mirror 8a is fixed above the uppermost position of the projector 5 moved by the moving member 6a'. The other reflecting mirror 8b has a moving member 6b' for moving the mirror 8b leftward and rightward along the top board 2a of the cooking table 2. The reflecting mirror 8b moves in conjunction with the projector 5. By thus moving the projector 5 and the reflecting mirror in conjunction with each other, the optical path length is the same at any projection positions, so that the focusing condition on the screen is maintained.

By thus forming a bending projection mechanism by means of the mirrors, no space is necessary for the movement of the projector 5, so that a storage space a is secured in the built-in kitchen 1. Since the length of the optical path for projection can be increased, the size of the projection lens disposed in the projector 5 can be reduced.

The images from the projector 5 are projected onto the rear side of the top board 2a of the cooking table 2 by way of the reflecting mirrors 8a and 8b (the arrow A in the figure). Since the top board 2a of the cooking table 2 is a transmissive screen, the user can view the images from the projector 5 through the cooking table 2. The images can be projected onto appropriate positions by the moving means 6a', and 6b'.

Using frosted glass instead of the transmissive screen reduces the price.

When images are projected from above like in the first embodiment, nothing can be placed between the screen and the projector because images are intercepted if something is placed therebetween. Moreover, there are occasions when the user inadvertently intercepts images. On the contrary, in the second embodiment, since images are projected from the rear side of the top board 2a of the cooking table 2, such problems are solved.

While this embodiment is the built-in kitchen having the cooking stove 3 and the sink 4 in the cooking table 2, the present invention is not limited thereto but is applicable to any types of cooking equipment. Moreover, the projector 5 may be disposed in any position as long as images are projected onto the transmissive screen of the top board 2a of the cooking table 2. Further, the position where the transmissive screen is formed is not limited to the position in the above-described arrangement.

Figure 6:
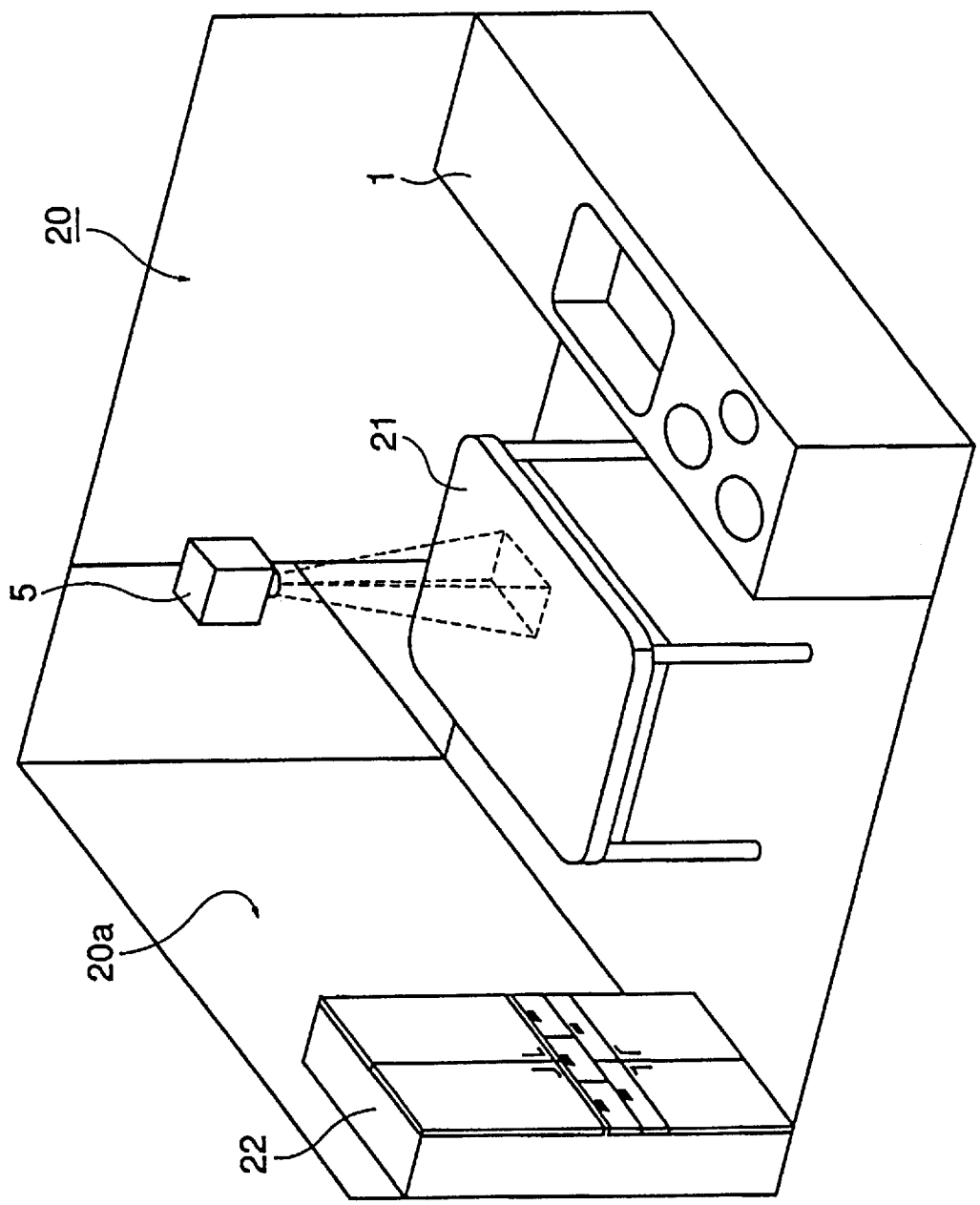
FIG. 6 is a perspective view of a kitchen in which a projector is disposed.

While the built-in kitchen of the present invention is characterized in that a projector is disposed, disposition of a projector in a kitchen also enables the user to view a recipe or a television program while staying in a working position. FIG. 6 is a perspective view showing a kitchen as an example of such an arrangement.

In this example, the projector 5 is disposed at a non-illustrated ceiling of a kitchen 20 and projects images onto the top board of a table 21 placed in the center of the kitchen 20. The projector 5 may be attached so that its projection direction can be changed or may be attached to another position in the kitchen 20. A cabinet 22 such as a cupboard or a food storage, or a wall 20a of the kitchen 20 can be used as the screen. That is, the present invention is not limited to the above-described arrangement as long as images can be projected onto places on which the person performing cooking can set his or her eyes.

As described above, according to the above-described embodiments, the user can view the images projected by the projector while staying in a working position. This frees the user from useless motions when he or she performs cooking while viewing a recipe or a television program on cooking.

Since the projector is disposed so as to project images from above the cooking table, images can be projected onto the place where the user's hands performing cooking are present and onto the foodstuff. Consequently, more visual instructions are successively provided, so that the user can perform cooking in accordance with the instructions.

In the arrangement where images are projected from below, it never occurs that images are intercepted by an inadvertent motion and that space for placing things is limited.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A built-in kitchen, comprising:
    a cooking table for placing and preparing food thereon;
    a projector that projects an image from above said cooking table; and
    a reflective screen onto which the image from the projector is projected, wherein
    said reflective screen is said cooking table.

2. A built-in kitchen, comprising:
    a cooking table for placing and preparing food thereon;
    a projector that projects an image from below said cooking table; and
    a transmissive screen onto which the image from the projector is projected, wherein said transmissive screen is said cooking table.

3. A cooking assisting image projecting system, comprising:
- a projector that projects a cooking assisting image; and
- a cooking table onto which the image from the projector is projected.

4. A cooking assisting image projecting system of claim 3, wherein the projector is disposed on a ceiling.

5. A method of cooking comprising the steps of:
- providing a cooking table for placing and preparing food thereon;
- providing a kitchen with a built-in projector,
- providing an image that projects from said projector,
- providing a screen in the kitchen onto which the image from the projector is projected,
- using the image to assist in cooking, and further including the step of using said cooking table as the screen.

6. A method of cooking as claimed in claim 5 further including the steps of:
- placing food on the cooking table, and
- positioning the image over the food.

7. In combination, a kitchen with a built-in projector comprising,
- a kitchen housing, said kitchen housing including a bottom base part, a top part, and a wall located between said bottom base part and said top part, said kitchen housing having a groove formed therein;
- a projector for projecting a cooking-assisting image, wherein a portion of said projector is slidably held in said groove; and
- a screen in said kitchen onto which said cooking-assisting image is projected, wherein
- said cooking-assisting image is utilized in a cooking process.

8. The kitchen with a built-in projector of claim 7, wherein said bottom base part includes a cooking table, sink, and cooking stove, and wherein said groove is formed in said top part such that said projector can slide over said cooking table, sink, and cooking stove for projecting images thereon.

9. The kitchen with a built-in projector of claim 7, wherein said groove is formed in said top part, said base part includes a cooking table and said wall includes a mirror, wherein in a first configuration said projector projects said cooking-assisting image onto said cooking table and in a second configuration said projector projects said cooking-assisting image onto said mirror which reflects said cooking-assisting image onto said wall.

10. The kitchen with a built-in projector of claim 9, wherein said mirror is pivotably attached to said wall whereby in said second configuration, said mirror is pivoted away from said wall.

11. The kitchen with a built-in projector of claim 9, wherein in said second configuration, said mirror is positioned between said projector and said cooking table such that said cooking-assisting image projected from said projector is prevented from projecting onto said cooking table.

12. The kitchen with a built-in projector of claim 9, wherein said mirror is a half mirror having two sides such that one side facing the projector in said second configuration reflects light and the other side in said second configuration transmits light.

13. The kitchen with a built-in projector of claim 7, wherein said bottom base part includes a fixed mirror, and a movable mirror slidably held in a channel formed in said bottom base part, wherein said groove is formed in said bottom base part such that said projector projects said cooking-assisting image onto said fixed mirror, said fixed mirror projects said cooking-assisting image onto said movable mirror, and said movable mirror reflects said cooking-assisting image onto said screen.

14. The kitchen with a built-in projector of claim 13, wherein said projector and movable mirror are adjustably slid in said groove and channel, respectively, in order to project a desired size and focus of the cooking-assisting image onto said screen.

15. The kitchen with a built-in projector of claim 13, wherein said screen is a transmissive screen.

16. A cooking assisting image projecting system, comprising:
- a cooking surface configured to have food placed thereon, and
- a projector for projecting an image on said cooking surface and configured such that said image is superimposed on said food.

17. A projector for use in a kitchen, comprising:
- a plurality of screens located in said kitchen;
- a projector for projecting an image in said kitchen; and
- a drive unit for moving said projector,
    wherein said drive unit moves said projector from a first position where said projector projects an image on one of said plurality of screens, to a second position where said projector projects an image on a different one of said plurality of screens.

18. The projector of claim 17, wherein at least one of said plurality of screens includes a cooking surface of said kitchen.

19. The projector of claim 17, wherein said projector is configured to slide from said first position to said second position.

20. The projector of claim 19, further including a support surface for holding said projector, said support surface having a groove formed therein, wherein at least a portion of said projector slides within said groove.

* * * * *